United States Patent
Bilu et al.

(10) Patent No.: US 11,144,719 B2
(45) Date of Patent: *Oct. 12, 2021

(54) SYSTEM AND METHOD FOR ARGUMENT RETRIEVAL

(71) Applicant: International Business Machines Corporation, Armonk, NY (US)

(72) Inventors: Yonatan Bilu, Jerusalem (IL); Liat Ein Dor, Tel-Aviv (IL); Noam Slonim, Jerusalem (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/697,224

(22) Filed: Nov. 27, 2019

(65) Prior Publication Data

US 2021/0157980 A1 May 27, 2021

(51) Int. Cl.
*G06F 17/00* (2019.01)
*G06F 40/205* (2020.01)
(Continued)

(52) U.S. Cl.
CPC .......... *G06F 40/205* (2020.01); *G06F 16/35* (2019.01); *G06F 16/93* (2019.01); *G06F 40/106* (2020.01);
(Continued)

(58) Field of Classification Search
CPC ........ G06F 40/205; G06F 16/93; G06F 16/35; G06F 40/106; G06F 40/56; G06F 40/40;
(Continued)

(56) References Cited

U.S. PATENT DOCUMENTS

| 7,996,379 | B1* | 8/2011 | Jain | ........................ G06F 16/951 |
| | | | | 707/706 |
| 2005/0203970 | A1* | 9/2005 | McKeown | ............. G06Q 10/10 |

(Continued)

FOREIGN PATENT DOCUMENTS

| CN | 103530281 | 1/2014 |
| CN | 107885870 | 4/2018 |

(Continued)

OTHER PUBLICATIONS

Ein-Dor et al. "Corpus Wide Argument Mining—a Working Solution," Association for the Advancement of Artificial Intelligence (AAAI) conference 2020, 9 pages.

(Continued)

*Primary Examiner* — Jason T Edwards
(74) *Attorney, Agent, or Firm* — G. E. Ehrlich (57) ABSTRACT

A system for identifying in a corpus of documents at least one argument relevant to an identified topic, comprising at least one hardware processor adapted to: producing a plurality of topic-related sentences relevant to the identified topic, each extracted from a document of the corpus of documents; producing a plurality of synthetic documents, each created by appending to a sentence of the plurality of topic-related sentences an identified amount of other sentences extracted from the respective document the topic-related sentence was extracted therefrom; identifying at least one argument relevant to the identified topic by inputting each of the plurality of synthetic documents to at least one machine learning model trained to identify an argument in response to a document; and outputting the at least one argument.

20 Claims, 6 Drawing Sheets

(51) Int. Cl.
*G06F 40/106* (2020.01)
*G06F 16/35* (2019.01)
*G06N 3/08* (2006.01)
*G06K 9/62* (2006.01)
*G06N 20/00* (2019.01)
*G06F 16/93* (2019.01)

(52) U.S. Cl.
CPC ......... *G06K 9/6256* (2013.01); *G06K 9/6269* (2013.01); *G06N 3/08* (2013.01); *G06N 20/00* (2019.01)

(58) Field of Classification Search
CPC ........ G06F 40/289; G06N 20/00; G06N 3/08; G06K 9/6256; G06K 9/6269
USPC ......................................................... 715/200
See application file for complete search history.

(56) References Cited

U.S. PATENT DOCUMENTS

| | | | | |
|---|---|---|---|---|
| 2008/0221878 | A1* | 9/2008 | Collobert | G06F 40/30 704/232 |
| 2013/0158984 | A1* | 6/2013 | Myslinski | G06F 16/951 704/9 |
| 2015/0324347 | A1* | 11/2015 | Bradshaw | G06F 40/40 704/9 |
| 2016/0140210 | A1* | 5/2016 | Pendyala | G06Q 50/18 707/737 |
| 2016/0140588 | A1* | 5/2016 | Bracewell | G06Q 30/0204 705/7.33 |
| 2018/0039695 | A1* | 2/2018 | Chalabi | G06N 5/022 |
| 2018/0232659 | A1* | 8/2018 | Ranatunga | G06Q 30/02 |
| 2019/0220515 | A1* | 7/2019 | Aharoni | G06N 5/022 |
| 2019/0332666 | A1* | 10/2019 | Dadachev | G06N 20/00 |

FOREIGN PATENT DOCUMENTS

| | | |
|---|---|---|
| CN | 108595407 | 9/2018 |
| WO | 2013172499 | 11/2013 |

OTHER PUBLICATIONS

Levy et al. "Context Dependent Claim Detection," Proceedings of COLING 2014, the 25th International Conference on Computational Linguistics: Technical Papers, pp. 1489-1500, Dublin, Ireland, Aug. 23-29, 2014.

Levy et al. "Towards an Argumentative Content Search Engine Using Weak Supervision," Proceedings of the 27th International Conference on Computational Linguistics, pp. 2066-2081, Santa Fe, New Mexico, USA, Aug. 20-26, 2018.

Levy et al. "Unsupervised Corpus-Wide Claim Detection," Proceedings of the 4th Workshop on Argument Mining, pp. 79-84, Copenhagen, Denmark, Sep. 8, 2017.

Roitman et al. "On the Retrieval of Wikipedia Articles Containing Claims on Controversial Topics," WWW'16 Companion, Apr. 11-15, 2016, Montréal, Québec, Canada, 6 pages.

Stab et al. "Cross-Topic Argument Mining from Heterogeneous Sources," Proceedings of the 2018 Conference on Empirical Methods in Natural Language Processing, pp. 3664-3674, Brussels, Belgium, Oct. 31-Nov. 4, 2018.

* cited by examiner

SYSTEM AND METHOD FOR ARGUMENT RETRIEVAL

BACKGROUND

The present invention, in some embodiments thereof, relates to a system for processing natural language and, more specifically, but not exclusively, to a system for retrieving arguments from a corpus of documents.

In the field of computerized natural language processing, argument mining is a form of artificial intelligence allowing a machine to interpret argumentation in natural language. An argument is a structure of language which may comprise one or more premises, a claim, and a conclusion whether the claim is supported or contradicted by the one or more premises. Artificial intelligence is increasingly incorporated into systems related to natural language processing in a variety of areas, increasing the need for effective and accurate argument mining. For example, research in areas such as social science and political science may use argument mining when assessing social media content (for example Facebook content, Twitter content, and reader comments on a news website). In another example, a recommendation system may use argument mining to extract arguments from product reviews.

Within argument mining, as used henceforth the term argument retrieval refers to extracting, from a corpus of documents, one or more arguments pertaining to an identified topic. The corpus of documents may be, but is not limited to, a corpus of textual documents. One example of a system using argument retrieval is an automated debating system. Another example of a system using argument retrieval is a system for aiding writing a speech or an essay on an identified topic, for example where there is a need to cover a spectrum of opinions with regard to the identified topic. Another example of using argument retrieval is in law related research, where there is a need to review a corpus of legal documents, for example for the purpose of arguing a legal case.

Argument retrieval differs from document search or passage retrieval in that argument retrieval is directed towards identifying only argumentative content, i.e. content related to supporting or contradicting a claim. In addition, there may be a need to retrieve a specified type of argument, for example supportive evidence in the form of study results. Other types of arguments include an expert opinion, a personal experience, a poll, a survey and an exemplifying event. By contrast, passage retrieval or document search retrieve any part of a document or an entire document related to the identified topic, possibly comprising both argumentative and non-argumentative content.

SUMMARY

It is an object of the present invention to provide a system and a method for retrieving one or more arguments related to an identified topic from a corpus of documents.

The foregoing and other objects are achieved by the features of the independent claims. Further implementation forms are apparent from the dependent claims, the description and the figures.

According to a first aspect of the invention, a system for identifying in a corpus of documents at least one argument relevant to an identified topic comprises at least one hardware processor adapted to: producing a plurality of topic-related sentences relevant to the identified topic, each extracted from a document of the corpus of documents; producing a plurality of synthetic documents, each created by appending to a sentence of the plurality of topic-related sentences an identified amount of other sentences extracted from the respective document the topic-related sentence was extracted therefrom; identifying at least one argument relevant to the identified topic by inputting each of the plurality of synthetic documents to at least one machine learning model trained to identify an argument in response to a document; and outputting the at least one argument.

According to a second aspect of the invention, a method for identifying in a corpus of documents at least one argument relevant to an identified topic comprises: producing a plurality of topic-related sentences relevant to the identified topic, each extracted from a document of the corpus of documents; producing a plurality of synthetic documents, each created by appending to a sentence of the plurality of topic-related sentences an identified amount of other sentences extracted from the respective document the topic-related sentence was extracted therefrom; identifying at least one argument relevant to the identified topic by inputting each of the plurality of synthetic documents to at least one machine learning model trained to identify an argument in response to a document; and outputting the at least one argument.

According to a third aspect of the invention, an argument generation system comprises at least one hardware processor adapted to: receiving an identified topic; accessing a corpus of documents; identifying in the corpus of documents at least one argument relevant to the identified topic by: producing a plurality of topic-related sentences relevant to the identified topic, each extracted from a document of the corpus of documents; producing a plurality of synthetic documents, each created by appending to a sentence of the plurality of topic-related sentences an identified amount of other sentences extracted from the respective document the topic-related sentence was extracted therefrom; identifying at least one argument relevant to the identified topic by inputting each of the plurality of synthetic documents to at least one machine learning model trained to identify an argument in response to a document; and outputting the at least one argument; and providing the at least one argument to at least one software object executed by the at least one hardware processor for the purpose of performing at least one argument related task.

With reference to the first and second aspects, in a first possible implementation of the first and second aspects of the present invention the at least one machine learning model is selected from a group of models consisting of: a neural network, a logistic regression model, and a support-vector machine. Optionally, the at least one machine learning model is trained to compute for each sentence of an input document an argument classification selected from an identified set of argument classifications. Optionally, at least one of the set of argument classifications is selected from a group consisting of: argument, non-argument, claim, and evidence. Using a machine learning model trained to compute an argument classification for each sentence of an input document increases accuracy of identification of the at least one argument relevant to the identified topic compared to other methods for identifying the at least one argument, for example using one or more pattern matching tests. Optionally, the at least one machine learning model is further trained to compute for each sentence of the input document an argument type classification selected from an identified set of argument type classifications. Optionally, at least one of the set of argument type classifications is selected from a group consisting of: study, expert opinion, personal experience, poll, survey, and exemplifying event. Using a machine learning model trained to compute an argument type classification facilitates outputting for the at least one argument an argument type thereof, thus increasing usability of an output of the system compared to other output of another system that does not comprise an argument type. Optionally the at least one machine learning model is further trained to identify at least one multi-sentence argument in response to the input document. Optionally, identifying the at least one argument relevant to the identified topic comprises identifying at least one multi-sentence argument relevant to the identified topic. Using a machine learning model trained to identify at least one multi-sentence argument facilitates detecting at least one multi-sentence argument in the corpus of documents, thus increases accuracy of an output of the system, the output comprising the at least one argument.

With reference to the first and second aspects, in a second possible implementation of the first and second aspects of the present invention producing the plurality of topic-related sentences comprises comparing at least one identified pattern, indicative of the identified topic, to a plurality of sentences extracted from at least one document of the corpus of documents. Using at least one identified pattern to produce the plurality of topic-related sentences facilitates using existing query based methods, thus reducing cost and time of deployment of a system implemented according to the present invention. Optionally, producing the plurality of topic-related sentences comprises inputting a plurality of sentences extracted from at least one document of the corpus of documents into at least one other machine learning model, trained to identify a relevant sentence in response to a topic and at least one input sentence. Optionally, the at least one other machine learning is selected from a group of models consisting of: a neural network, a logistic regression model, and a support-vector machine. Using another machine learning model trained to identify a relevant sentence in response to a topic increases accuracy of the plurality of topic-related sentences and thus increases accuracy of an output of the system, the output comprising the at least one argument.

With reference to the first and second aspects, in a third possible implementation of the first and second aspects of the present invention outputting the at least one argument comprises at least one of: sending the at least one argument to at least one other hardware processor via at least one digital communication network interface connected to the at least one hardware processor, providing the at least one argument to at least one software object executed by the at least one hardware processor for the purpose of performing an argument related task, displaying the at least one argument on a display device, and storing the at least one argument on at least one non-volatile digital storage connected to the at least one hardware processor.

With reference to the first and second aspects, in a fourth possible implementation of the first and second aspects of the present invention the identified amount of other sentences extracted from the respective document comprises a plurality of paragraph sentences of a paragraph of the respective document containing the sentence. Optionally, the identified amount of other sentences extracted from the respective document comprises one or more of: a first plurality of sentences of a first identified amount of predecessor paragraphs immediately preceding the sentence in the respective document; and a second plurality of sentences of a second identified amount of successor paragraphs immediately following the sentence in the respective document. Using a context of a relevant sentence to identify the at least one argument, where the context comprises a paragraph comprising the relevant sentence, and additionally or alternatively a first plurality of sentences of one or more predecessor paragraphs and additionally or alternatively a second plurality of sentences of one or more successor paragraphs facilitates identifying one or more arguments in one or more sentences having a lexical format that does not adhere to a query used to identify the set of relevant sentence. In addition, using the context of the relevant sentence facilitates identifying one or more other arguments indirectly or implicitly relevant to the identified topic, increasing accuracy of an output of the system comprising the at least one argument.

With reference to the first and second aspects, in a fifth possible implementation of the first and second aspects of the present invention the at least one hardware processor is further adapted to accessing the corpus of documents via at least one of: at least one other digital communication network interface connected to the at least one hardware processor, and at least one other non-volatile digital storage connected to the at least one hardware processor.

With reference to the first and second aspects, in a sixth possible implementation of the first and second aspects of the present invention the at least one hardware processor is further adapted to: receiving at least one identified argument relevant to the topic; and identifying in the at least one argument at least one counter-argument, countering the at least one identified argument. Identifying in the at least one argument at least one counter-argument, countering the at least one identified argument, increases usability of an output of the system, the output comprising the at least one argument.

With reference to the first and second aspects, in a seventh possible implementation of the first and second aspects of the present invention the at least one hardware processor is further adapted to: identifying in the corpus of documents a plurality of relevant documents, each relevant to the identified topic; and adding the plurality of relevant documents to the plurality of synthetic documents for the purpose of identifying the at least one argument.

With reference to the third aspect, in a first possible implementation of the third aspect of the present invention the at least one hardware processor is further adapted to: in at least one of a plurality of iterations: receiving at least one identified argument related to the identified topic; and identifying in the at least one argument at least one counter-argument, countering the at least one identified argument. Identifying in the at least one argument at least one counter-argument, countering the at least one identified argument, increases usability of an output of the argument generation system, the output comprising the at least one argument.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to a system for processing natural language and, more specifically, but not exclusively, to a system for retrieving arguments from a corpus of documents. The following disclosure focuses on a non-limiting example of processing a corpus of textual documents, however the present invention is not limited to textual documents and may be applied to documents comprising other forms of natural language, for example an audio recording.

Some existing systems for argument retrieval use document level analysis to retrieve arguments related to an identified topic. Such systems identify in the corpus of documents a set of relevant documents related to the identified topic. Then, each document of the set of relevant documents is analyzed to identify one or more arguments related to the identified topic by classifying one or more parts of the document as argumentative. In some such systems, each sentence of each document is classified. Some examples of a sentence classification are argumentative, non-argumentative, a claim, and evidence. This document level approach has an advantage of facilitating detection of all arguments within a document, including arguments where the identified topic is referenced indirectly or implicitly. In addition, this approach has another advantage of facilitating detection of multi-sentence arguments. However, as for most topics the amount of related documents in the corpus may be limited, this approach may fail to detect a full breadth of possible arguments related to the identified topic.

Some other existing systems for argument retrieval use sentence level analysis to retrieve arguments related to the identified topic. Such systems index all sentences of all documents of the corpus of documents, and retrieve a set of relevant sentences, relevant to the identified topic, from all sentences of all documents. To retrieve the set of relevant sentences such system may classify each of all of the sentences as either relevant or non-relevant to the identified topic, for example using a classification model or by applying one or more classification tests to each of all the sentences. A classification test may be a query, indicative of the identified topic. Then, each sentence is further classified to identify arguments. This sentence based approach facilitates detecting arguments relevant to the topic in one or more documents not directly discussing the relevant topic, increasing the variety of arguments detected compared to a set of arguments detected using a document level approach. However, when one or more queries are used to retrieve the set of relevant sentences, retrieved sentences must adhere to a format specified by the one or more queries, thereby limiting the lexical format of an argument that may be retrieved. A sentence that does not adhere to the lexical format of the one or more queries may not be included in the set of relevant sentences, and any argument contained therein may not be retrieved. In addition, this sentence level approach may miss arguments that are indirectly related to the identified topic. Such arguments may be in another sentence of a paragraph containing a relevant sentence, and additionally or alternatively in yet another sentence in another paragraph of the respective document the relevant sentence was detected therein. Sentences comprising such arguments would not be included in the set of relevant sentences as they may not be directly related the identified topic, for example when such sentences do not directly match a query indicative of the identified topic.

To combine advantages of both above mentioned approaches when identifying in a corpus of documents one or more arguments relevant to an identified topic, the present invention, in some embodiments thereof, proposes applying document level analysis by at least one hardware processor to the context of a sentence related to the identified topic. In such embodiments, the context of a sentence is an identified amount of sentences before, and additionally or alternatively after, the sentence. The context of the sentence may comprise a paragraph the sentence is therein. The identified amount of sentences may comprise an identified amount of paragraphs before, and additionally or alternatively after, the paragraph the sentence is therein. Optionally, applying the document level analysis comprises executing one or more machine learning models, for example a neural network, trained to identify an argument in response to a document. Some other examples of a machine learning model are a logistic regression model and a support-vector model. Optionally, the present invention proposes producing a plurality of topic-related sentences, relevant to the identified topic, where each is extracted from one of a corpus of documents, and creating each of a plurality of synthetic documents from one of the plurality of topic-related sentences. Optionally, the plurality of topic-related sentences is produced using one or more pattern matching methods, comparing at least one identified pattern indicative of the identified topic, to a plurality of sentences extracted from one or more documents of the corpus of documents. Optionally, the plurality of topic-related sentences is produced using one or more other machine learning models, trained to identify a relevant sentence in response to a topic and one or more input sentences. Optionally, each of the plurality of topic-related sentences is argumentative. Optionally, a synthetic document of the plurality of synthetic documents is created by appending to one of the plurality of topic-related sentences one or more other sentences extracted from the respective document the topic-related sentence was extracted therefrom. Optionally, one or more arguments relevant to the identified topic are identified in the plurality of synthetic documents. Optionally, each of the plurality of synthetic documents is input to one or more other machine learning models trained to identify one or more arguments in response to a document, for the purpose of identifying the one or more arguments related to the identified topic. Creating a synthetic document by appending to a topic-related sentence its context facilitates applying document level analysis to documents implicitly or indirectly related to the identified topic. Applying document level analysis to a synthetic document comprising a topic-related sentence and its context facilitates identifying one or more arguments in one or more sentences not adhering to a lexical format used in a query to identify argumentative topic-related sentences. In addition, applying document level analysis to a synthetic document comprising a topic-related sentence and its context facilitates identifying one or more other arguments implicitly or indirectly related to the identified topic when the topic-related sentence is extracted from a document not directly related to the identified topic, increasing an amount and a variety of a plurality of arguments detected in the corpus of documents by a system implementing the present invention compared to another system implementing only a document level approach or a sentence level approach. In addition, applying document level analysis to a synthetic document comprising a topic-related sentence and its context facilitates identifying multi-sentence arguments comprising the topic-related sentence when the topic-related sentence is extracted from a document not directly related to the identified topic, increasing an amount and a variety of a plurality of arguments detected in the corpus of documents by a system implementing the present invention compared to another system implementing only a document level approach or a sentence level approach. An argumentative sentence is likely to be located in an argumentative paragraph or in a vicinity of an argumentative paragraph. Consequently, using a plurality of topic-related sentences where each is argumentative increases a likelihood of a context of each of the topic-related sentences comprising one or more arguments related to the identified topic, thus increasing an amount of a plurality of arguments detected in the corpus of documents.

In addition, in some embodiments of the present invention, a plurality of relevant documents are identified in the corpus of documents, and are added to the plurality of synthetic documents. Optionally, each of the plurality of relevant documents is input into the one or more machine learning models for the purpose of identifying the one or more arguments related to the identified topic. Inputting a relevant document into the machine learning model facilitates increasing an amount and a variety of a plurality of arguments detected in the corpus of documents by a system implementing the present invention compared to another system implementing only a sentence level approach.

In addition, the present invention proposes in some embodiments thereof, outputting the one or more identified arguments. Optionally, outputting the one or more arguments comprises providing the one or more arguments to one or more software objects, and additionally or alternatively, to one or more other hardware processors for the purpose of performing an argument related task, for example an autonomous debater. Another example of an argument related task is producing one or more counter-arguments to an identified position regarding the identified topic. Optionally, outputting the one or more arguments comprises providing the one or more arguments to a user, for example by displaying the one or more arguments on a display device, for example a computer monitor. Optionally, outputting the one or more arguments comprises storing the one or more arguments on a non-volatile digital storage, for example a hard-disk. Providing the one or more arguments, identified according to the present invention, for the purpose of performing one or more argument related tasks, increases accuracy of a result of performing the one or more argument related tasks compared to another result of performing the one or more argument related tasks using other arguments identified by another system using a document level approach or a sentence level approach only.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, henceforth the term "processor" is used to mean "at least one hardware processor" and the terms are used interchangeably. A processor may be any kind of programmable or non-programmable circuitry that is configured to carry out the operations described below. The processor may comprise hardware as well as software. The processor may comprise a transitory or non-transitory memory that carries a program which causes the processor to perform the respective operations when the program is executed by the processor.

Figure 1:
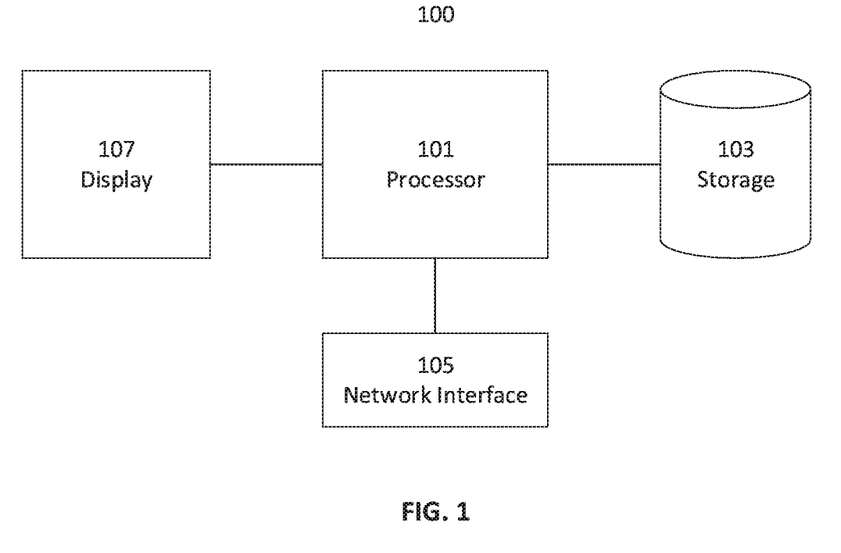
FIG. 1 is a schematic block diagram of an exemplary system, according to some embodiments of the present invention.

Reference is now made to FIG. 1, showing a schematic block diagram of an exemplary system 100, according to some embodiments of the present invention. In such embodiments, processor 101 is connected to one or more non-volatile digital storage 103 (storage 103), for example for the purpose of accessing a corpus of documents. Some examples of a non-volatile digital storage are a hard disk drive, a non-volatile random access memory (NVRAM), a network connected storage and a storage network. Optionally, processor 101 is connected to at least one digital communication network interface 105, for example for the purpose of outputting one or more arguments retrieved from the corpus of documents. Optionally, processor 101 is connected to storage 103 via at least one digital communication network interface 105. Optionally, at least one digital communication network interface 105 is connected to a local area network (LAN), for example an Ethernet network. Other examples of a LAN are a Wi-Fi network and a coaxial cable based LAN such as a MoCA LAN. Optionally, at least one digital communication network interface 105 is connected to a wide area network (WAN) such as a cellular WAN or the Internet. Optionally, processor 101 is connected via at least one digital communication network interface 105 to one or more other processors, for example for the purpose of sending thereto the one or more arguments retrieved from the corpus of documents. Optionally, processor 101 is connected to one or more display devices 107, for the purpose of outputting the one or more arguments retrieved from the corpus of documents. An example of a display device is a computer monitor.

In some embodiments of the present invention, to retrieve one or more arguments related to an identified topic from a corpus of documents, system 100 implements the following optional method.

Figure 2:
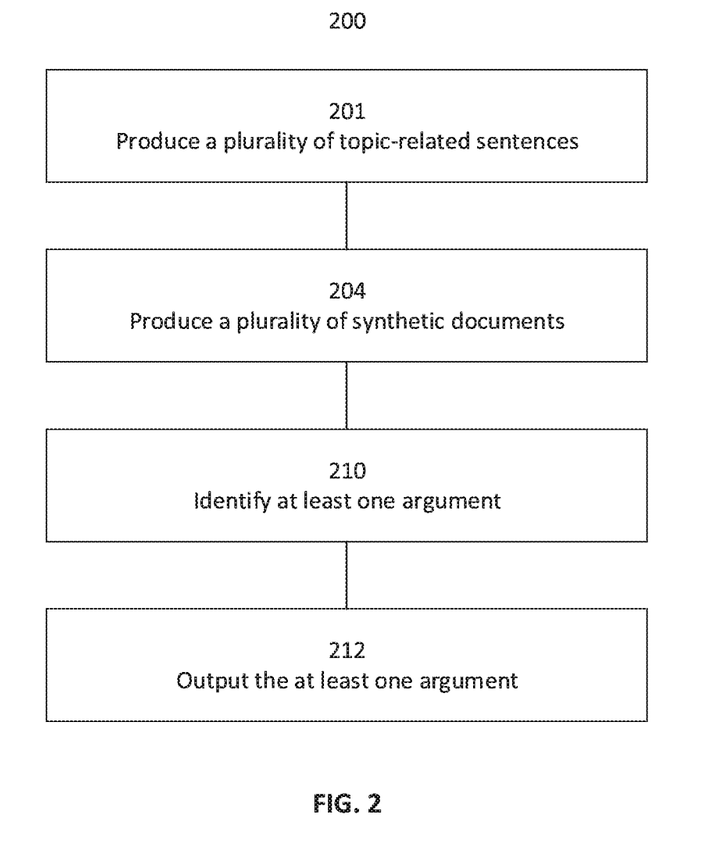
FIG. 2 is a flowchart schematically representing an optional flow of operations for argument retrieval, according to some embodiments of the present invention.

Reference is now made also to FIG. 2, showing a flowchart schematically representing an optional flow of operations 200 for argument retrieval, according to some embodiments of the present invention. In such embodiments, in 201 processor 101 produces a plurality of topic-related sentences relevant to the identified topic. Optionally, each of the plurality of topic-related sentences is argumentative. Optionally, each of the plurality of topic-related sentences is extracted from a document of the corpus of documents. Optionally, producing the plurality of topic-related sentences comprises comparing at least one identified pattern, indicative of the identified topic, to a plurality of sentences extracted from at least one document of the corpus of documents. Optionally, the at least one identified pattern is additionally indicative of an argumentative sentence. Optionally, the at least one identified pattern is a regular expression. Optionally, the at least one identified pattern comprises at least one word of one or more identified lexicons. Optionally, an identified lexicon comprises a plurality of words indicative of one or more sentiments. Optionally, an identified lexicon comprises another plurality of words indicative of one or more study related terms, for example poll, survey and research. Optionally, an identified lexicon comprises yet another plurality of words indicative of one or more expertise titles for example doctor, professor, researcher, faculty, economist, guru, specialist, and analyst. Optionally, producing the plurality of topic-related sentences comprises processor 101 executing at least one sentence-level machine learning model trained to identify a relevant sentence in response to a topic and one or more input sentences. Optionally the at least one sentence-level machine learning model is trained to identify an argumentative relevant sentence in response to the topic and the one or more input sentences. Optionally, producing the plurality of topic-related sentences comprises processor 101 inputting a plurality of sentences extracted from one or more documents of the corpus of documents into the sentence-level machine learning model. Optionally, the sentence-level machine learning model is a neural network. Other examples of a machine learning model are a logistic regression model and a support-vector machine. Optionally, at least part of the corpus of documents is stored on storage 103 and processor 101 accesses the at least part of the corpus of documents by accessing storage 103. Optionally, processor 101 accesses at least another part of the corpus of documents via at least one digital communication network interface 105, for example by receiving the at least another part of the corpus of documents via at least one digital communication network interface 105. Optionally, at least some of the corpus of documents are textual documents. Optionally, the corpus of documents comprises one or more audio recordings. Optionally, the corpus of documents comprises one or more video recordings.

In 204, processor 101 optionally produces a plurality of synthetic documents, each created by appending to a sentence of the plurality of topic-related sentences an identified amount of other sentences. Optionally, the identified amount of other sentences is a context of the sentence in the respective document the topic-related sentence was extracted therefrom, extracted from the respective document. Optionally, the context of the sentence comprises a paragraph of the respective document containing the sentence, thus the identified amount of other sentences comprises a plurality of paragraph sentences of the paragraph of the respective document containing the sentence. Optionally, the context of the sentence comprises one or more paragraphs of the respective document preceding the sentence in the respective document. Thus, the identified amount of other sentences optionally comprises a first plurality of sentences of a first identified amount of predecessor paragraphs immediately preceding the sentence in the respective document. Some examples of a first identified amount of predecessor paragraphs are 1, 2, 3, 6, 10, and 12. Optionally, the first identified amount of predecessor paragraphs consists of all predecessor paragraphs preceding the sentence in the respective document. Optionally, the context of the sentence comprises one or more other paragraphs of the respective document following the sentence in the respective document. Thus, the identified amount of other sentences optionally comprises a second plurality of sentences of a second identified amount of successor paragraphs immediately following the sentence in the respective document. Some example of a second identified amount of successor paragraphs are 1, 2, 3, 6, 10, and 12. Optionally, the second identified amount of successor paragraphs consists of all successor paragraphs following the sentence in the respective document.

In 210, processor 101 optionally identifies one or more arguments relevant to the identified topic, optionally by inputting each of the plurality of synthetic documents to at least one document-level machine learning model trained to identify an argument in response to a document. Optionally, the at least one document-level machine learning model is a neural network. Optionally the neural comprises a bidirectional long short-term memory (biLSTM) layer. Other examples of a neural network are a recurrent neural network and a transformer neural network. Other examples of a document-level machine learning model area a logistic regression model and a support-vector machine. Optionally, the at least one document-level machine learning model is trained to compute for each sentence of an input document an argument classification, optionally selected from an identified set of argument classifications. Some examples of an argument classification are: an argument, a non-argument claim, and evidence. Optionally, identifying the at least one argument relevant to the identified topic comprises identifying one or more multi-sentence arguments relevant to the identified topic. To do so, the at least one document-level machine learning model is optionally further trained to identify one or more multi-sentence arguments in response to the input document. Optionally, the at least one document-level machine learning model is further trained to compute for each sentence of the input document an argument type classification, optionally selected from an identified set of argument type classifications. Some examples of an argument type classification are: study, studies, research, researches, report, reports, poll, polls, survey, surveys, analysis, analyses, evidence, observation, observations, exploration, explorations, documentation, meta-analysis, and exemplifying event.

Figure 3:
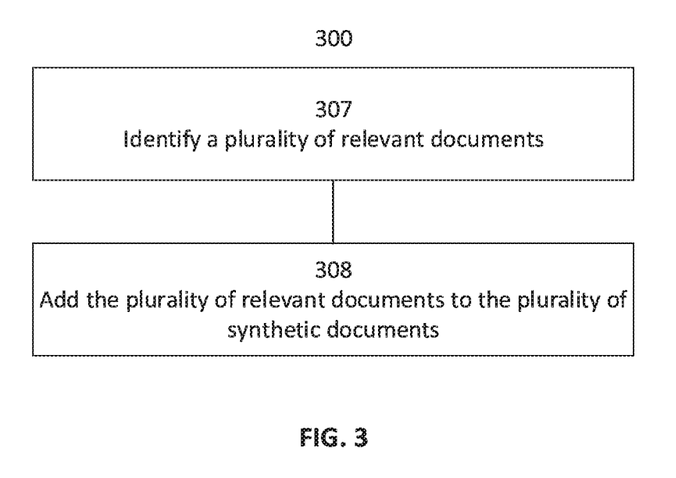
FIG. 3 is a flowchart schematically representing another optional flow of operations for argument retrieval, according to some embodiments of the present invention.

The corpus of documents may comprise a plurality of relevant documents, each relevant to the identified topic. In some embodiments of the present invention, processor 101 uses, in addition to the plurality of synthetic documents, the plurality of relevant documents to identify the one or more arguments relevant to the identified topic. Reference is now made also to FIG. 3, showing a flowchart schematically representing another optional flow of operations 300 for argument retrieval, according to some embodiments of the present invention. In such embodiments, in 307 processor 101 identifies in the corpus of documents a plurality of relevant documents, each relevant to the identified topic. In 208 processor 101 optionally adds the plurality of relevant documents to the plurality of synthetic documents for the purpose of identifying the one or more arguments relevant to the identified topic. Optionally, inputting each of the plurality of synthetic documents to the at least one document-level machine learning model comprises inputting each of the plurality of relevant documents to the at least one document-level machine learning model.

Figure 4:
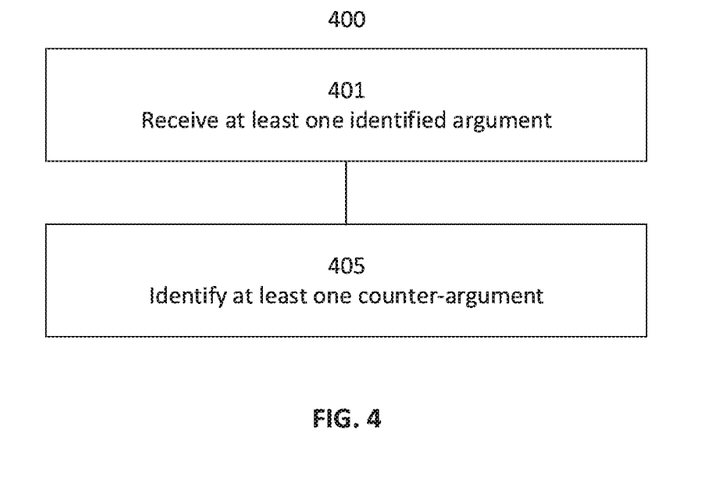
FIG. 4 is a flowchart schematically representing an optional flow of operations for identifying a counter-argument, according to some embodiments of the present invention.

In some embodiments of the present invention, identifying the one or more arguments comprises identifying one or more counter-arguments contradicting at least one identified argument. Reference is now made also to FIG. 4, showing a flowchart schematically representing an optional flow of operations 400 for identifying a counter-argument, according to some embodiments of the present invention. In such embodiments, in 401 processor 101 receives one or more identified arguments relevant to the topic. In 405, processor 101 optionally identifies, in the one or more arguments identified in 210, one or more counter-arguments contradicting at least one identified argument of the one or more identified arguments. Optionally, the one or more counter-arguments refute the at least one identified argument. Optionally, the one or more counter-arguments argue a claim opposite to another claim of the at least one identified argument.

Reference is now made again to FIG. 2. In 212, processor 101 optionally outputs the one or more arguments identified in 210. Optionally, outputting the one or more arguments comprises outputting an indication of identifying in 401 the one or more counter-arguments. Optionally, outputting the one or more arguments comprises providing the one or more arguments to one or more software objects for the purpose of executing an argument related task. An example of an argument related task is automated debate. Another example of an argument related task is essay generation. Another example of an argument related task is generation of a recommendation. Optionally, the one or more software objects are executed by processor 101. Optionally, the one or more software objects are executed by one or more other processors. Optionally, processor 101 provides the one or more arguments to the one or more software objects by sending the one or more arguments to the one or more other processors via at least one digital communication network interface 105. Optionally, processor 101 stores the one or more arguments on storage 103. Optionally, processor 101 displays the one or more arguments on one or more display devices 107, for example for the purpose of providing the one or more arguments to a user. Optionally, processor 101 sends the one or more arguments via at least one digital communication network interface 105 to the one or more other processors for the purpose of providing the one or more arguments to a user of the one or more other processors.

In some embodiments of the present invention, system 100 is an argument generation system. In such embodiments, system 100 may implement the following optional method.

Figure 5:
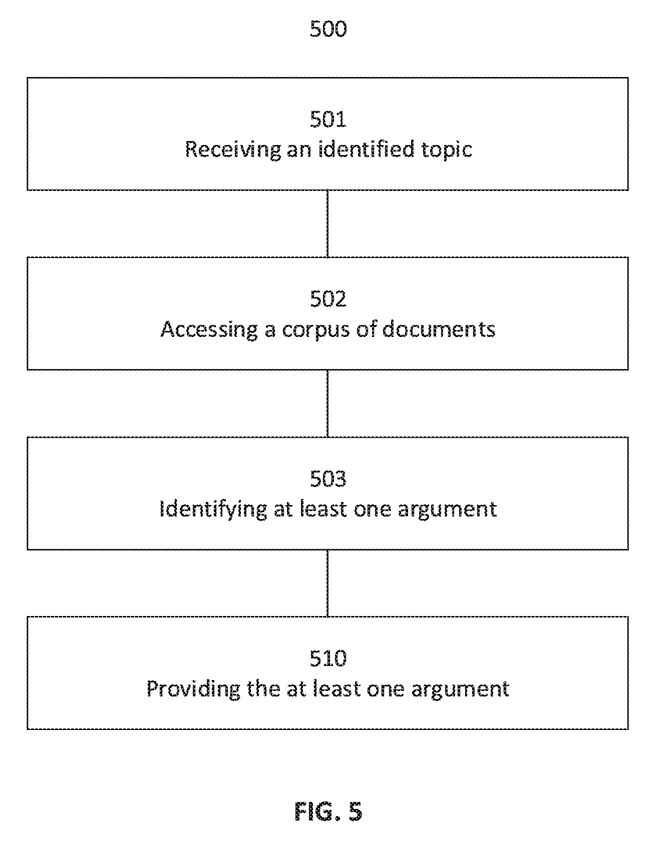
FIG. 5 is a flowchart schematically representing an optional flow of operations for argument generation, according to some embodiments of the present invention.

Reference is now made also to FIG. 5, showing a flowchart schematically representing an optional flow of operations 500 for argument generation, according to some embodiments of the present invention. In such embodiments, in 501 processor 101 receives an identified topic, and in 502 processor 101 optionally accesses a corpus of documents. Optionally the corpus of documents is stored on storage 103. Optionally, processor 101 accesses the corpus of documents via at least one digital communication network interface 105. In 503, processor 101 optionally identifies at least one argument relevant to the identified topic, optionally using method 200. In 510, processor 101 optionally provides the at least one argument to one or more software objects executed by processor 101 for the purpose of performing one or more argument related tasks. Optionally, system 100 implements method 500 when system 100 is part of an autonomous debating system. System 100 may be part of an autonomous essay composer. System 100 may be part of an aid for speakers, and additionally or alternatively for students.

Figure 6:
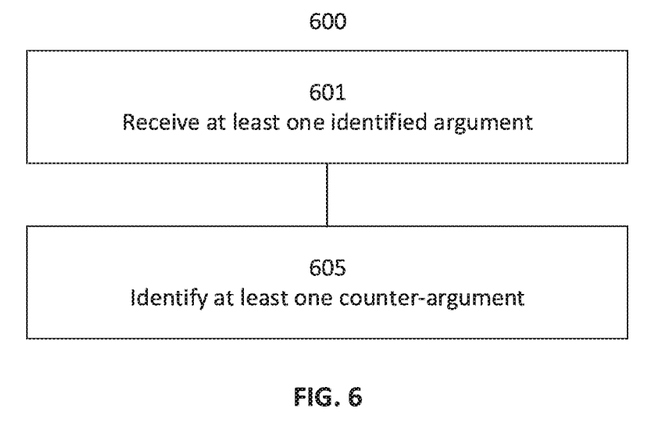
FIG. 6 is a flowchart schematically representing another optional flow of operations for argument generation, according to some embodiments of the present invention.

In some embodiments of the present invention, for example when system 100 implements method 500 as part of an autonomous debating system, system 100 may identify one or more counter-arguments in response to an identified argument. Reference is now made also to FIG. 6, showing another optional flow of operations 600 for argument generation, according to some embodiments of the present invention. In such embodiments, in 601 processor 101 receives at least one identified argument related to the identified topic and in 605 processor 101 optionally identifies in the at least one argument one or more counter-arguments countering the at least one identifies argument. Optionally, processor 101 repeats 601 and 605 in one or more iterations of a plurality of iterations. Optionally, processor 101 repeats 510 in each of the one or more iterations, i.e. processor 101 may output one or more counter-arguments in each of the one or more iterations, each in response to the at least one identified argument received in the respective iteration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for identifying in a corpus of documents at least one argument relevant to an identified topic, comprising at least one hardware processor adapted to:
   identifying a plurality of topic-related sentences relevant to the identified topic in a plurality of documents of the corpus of documents;
   producing a plurality of synthetic documents, each comprising a plurality of sentences, wherein a first sentence of the plurality of sentences of each respective synthetic document is a respective one of the identified plurality of topic-related sentences, extracted and copied from a respective one of the plurality of documents and wherein other sentences of the plurality of sentences of said each respective synthetic document are an identified amount of other sentences extracted from the respective document from which the topic-related sentence was extracted;

identifying at least one synthetic document, among the plurality of produced synthetic documents, containing an argument relevant to the identified topic, by analyzing each of the plurality of synthetic documents by at least one machine learning model trained to identify an argument in response to an inputted document; and outputting the at least one identified synthetic document;

wherein said at least one argument is a structure of language which comprises one or more premises, a claim, and a conclusion.

2. The system of claim 1, wherein the at least one hardware processor is further adapted to:

identifying in the corpus of documents a plurality of relevant documents, each relevant to the identified topic; and adding the plurality of relevant documents to the plurality of synthetic documents for the purpose of identifying the at least one synthetic document containing said argument.

3. The system of claim 1, wherein the at least one machine learning model is selected from a group of models consisting of: a neural network, a logistic regression model, and a support-vector machine.

4. The system of claim 1, wherein the at least one machine learning model is trained to compute for each sentence of an input document an argument classification selected from an identified set of argument classifications.

5. The system of claim 4, wherein at least one of the set of argument classifications is selected from a group consisting of: argument, non-argument, claim, and evidence.

6. The system of claim 4, wherein the at least one machine learning model is further trained to compute for each sentence of the input document an argument type classification selected from an identified set of argument type classifications.

7. The system of claim 6, wherein at least one of the set of argument type classifications is selected from a group consisting of: study, expert opinion, personal experience, poll, survey, and exemplifying event.

8. The system of claim 4, wherein the at least one machine learning model is further trained to identify at least one multi-sentence argument in response to the inputted document; and wherein identifying the at least one synthetic document containing the argument relevant to the identified topic comprises identifying at least one multi-sentence argument relevant to the identified topic.

9. The system of claim 1, wherein producing the plurality of topic-related sentences comprises comparing at least one identified pattern, indicative of the identified topic, to a plurality of sentences extracted from at least one document of the corpus of documents.

10. The system of claim 1, wherein producing the plurality of topic-related sentences comprises inputting a plurality of sentences extracted from at least one document of the corpus of documents into at least one other machine learning model, trained to identify a relevant sentence in response to a topic and at least one input sentence.

11. The system of claim 10, wherein the at least one other machine learning is selected from a group of models consisting of: a neural network, a logistic regression model, and a support-vector machine.

12. The system of claim 1, wherein outputting the at least one identified synthetic document containing said argument comprises at least one of:

sending the at least one argument to at least one other hardware processor via at least one digital communication network interface connected to the at least one hardware processor, providing the at least one argument to at least one software object executed by the at least one hardware processor for the purpose of performing an argument related task, displaying the at least one argument on a display device, and storing the at least one argument on at least one non-volatile digital storage connected to the at least one hardware processor.

13. The system of claim 1, wherein the identified amount of other sentences extracted from the respective document comprises a plurality of paragraph sentences of a paragraph of the respective document containing the sentence.

14. The system of claim 1, wherein the identified amount of other sentences extracted from the respective document comprises one or more of:

a first plurality of sentences of a first identified amount of predecessor paragraphs immediately preceding the sentence in the respective document; and a second plurality of sentences of a second identified amount of successor paragraphs immediately following the sentence in the respective document.

15. The system of claim 1, wherein the at least one hardware processor is further adapted to accessing the corpus of documents via at least one of: at least one other digital communication network interface connected to the at least one hardware processor, and at least one other non-volatile digital storage connected to the at least one hardware processor.

16. The system of claim 1, wherein the at least one hardware processor is further adapted to:

receiving at least one identified argument relevant to the topic; and identifying in the at least one argument at least one counter-argument, countering the at least one identified argument.

17. The system of claim 1, wherein said corpus of documents includes at least one recording in a form selected from audio recording and video recording.

18. A method for identifying in a corpus of documents at least one argument relevant to an identified topic, comprising:

identifying a plurality of topic-related sentences relevant to the identified topic in a plurality of documents of the corpus of documents;

producing a plurality of synthetic documents, each comprising a plurality of sentences wherein a first sentence of the plurality of sentences of each respective synthetic document is a respective one of the identified plurality of topic-related sentences, extracted and copied from a respective one of the plurality of documents and wherein other sentences of the plurality of sentences of said each respective synthetic document are an identified amount of other sentences extracted from the respective document from which the topic-related sentence was extracted;

identifying t least one synthetic document, among the plurality of produced synthetic documents, containing an argument relevant to the identified topic, by analyzing each of the plurality of synthetic documents by at least one machine learning model trained to identify an argument in response to an inputted document; and outputting the at least one identified synthetic document;

wherein said at least one argument is a structure of language which comprises one or more premises, a claim, and a conclusion.

19. An argument generation system, comprising at least one hardware processor adapted to:
   receiving an identified topic;
   accessing a corpus of documents;
   identifying in the corpus of documents at least one argument relevant to the identified topic by:
      identifying a plurality of topic-related sentences relevant to the identified topic in a plurality of documents of the corpus of documents;
      producing a plurality of synthetic documents, each comprising a plurality of sentences, wherein a first sentence of the plurality of sentences of each respective synthetic document is a respective one of the identified plurality of topic-related sentences, extracted and copied from a respective one of the plurality of documents and wherein other sentences of the plurality of sentences of said each respective synthetic document are an identified amount of other sentences extracted from the respective document from which the topic-related sentence was extracted;
      identifying at least one synthetic document, among the plurality of produced synthetic documents, containing an argument relevant to the identified topic, by analyzing each of the plurality of synthetic documents by at least one machine learning model trained to identify an argument in response to an inputted document; and
      outputting the at least one identified synthetic document; and
   providing the at least one identified synthetic document to at least one software object executed by the at least one hardware processor for the purpose of performing at least one argument related task;
   wherein said at least one argument is a structure of language which comprises one or more premises, a claim, and a conclusion.

20. The system of claim 19, wherein the at least one hardware processor is further adapted to:
   in at least one of a plurality of iterations:
      receiving at least one identified argument related to the identified topic; and
      identifying in the at least one argument at least one counter-argument,
   countering the at least one identified argument.

* * * * *